July 24, 1962  N. H. CHERRY  3,046,402
MULTIPLE THICKNESS TIMES DENSITY GAMMA GAUGE
Filed April 28, 1960
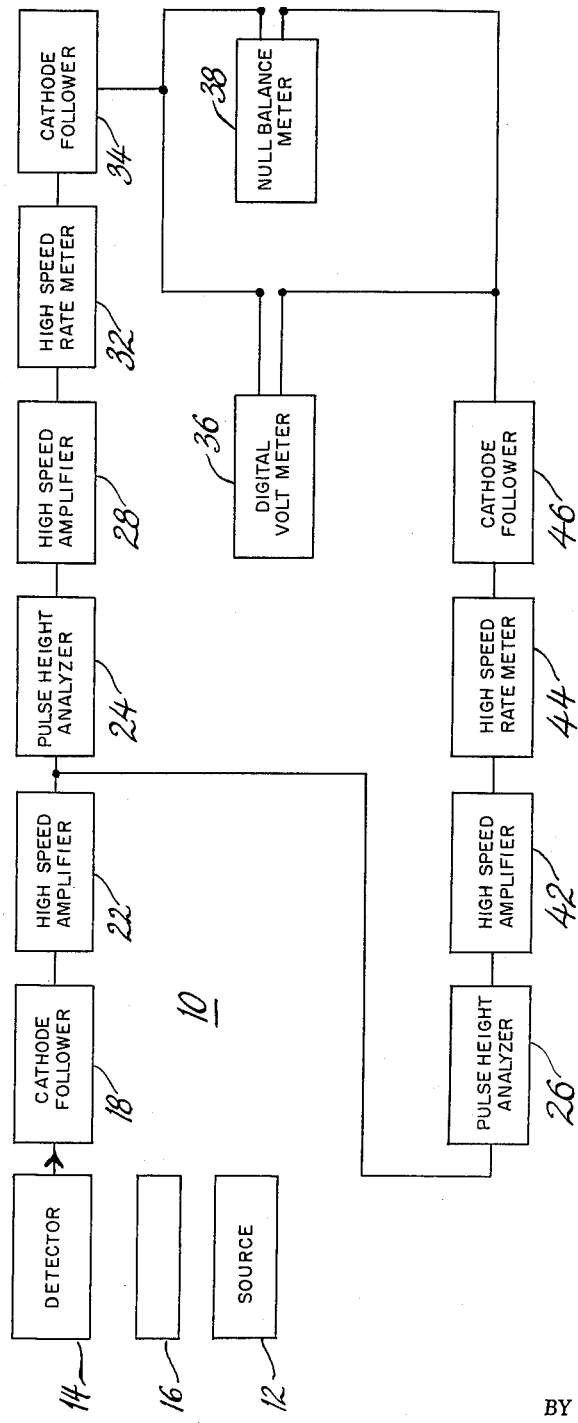
INVENTOR.
NORMAN H. CHERRY
BY # header omitted

3,046,402
MULTIPLE THICKNESS TIMES DENSITY GAMMA GAUGE
Norman H. Cherry, Southampton, Pa., assignor to the United States of America as represented by the United States Atomic Energy Commission
Filed Apr. 28, 1960, Ser. No. 25,489
6 Claims. (Cl. 250—83.3)

The present invention relates to a double thickness times density gamma gauge and more particularly to a gamma gauge to be used in the simultaneous measurement of the thicknesses or densities of two dissimilar materials in close proximity with each other.

A variety of devices are in existence to utilize the so-called sub-atomic particles and electro-magnetic radiations to measure the thickness of materials. In a typical arrangement, a material whose thickness is to be measured is interposed between the source of the radiation or beam and the detecting device so that changes in the thickness of the material attenuate to varying degrees the intensity of the beam in accordance with these changes. In gauges of this type, the material attenuates the intensity of the beam passing therethrough by absorption of energy from the beam. Given a material of fixed composition, the degree of absorption by the material is a function of its thickness. Should the material vary in density, this of course also would produce a change in the attenuation of the beam. If the material whose thickness is to be measured is a combination of more than one material such as, for example, a base material with a coating thereon, the use of such measuring gauges would not produce a result which would indicate directly the variation of the thickness of the basic material or of the coating but will produce a signal which is the function of the combined effect of the changes of the thicknesses and densities of the various materials.

This invention involves a unique arrangement for measuring in one case the thickness of a material provided with a coating as for example a thickness of steel clad in copper. High penetrating gamma radiation is utilized in accordance with this invention.

In order to accomplish the measurement of the thickness of the material having the coating thereon, two gamma sources producing gamma radiation of different, narrow band energy levels, so-called monoenergetic beams of gamma photons, are utilized. The coated material of unknown thickness is placed between the sources and the detecting apparatus which produces a composite signal recording the effect of the gamma radiation after passing through the material. In accordance with this invention, the signals produced by the detecting device are processed and separated in accordance with the energy levels involved, so that there are produced signals representative of the product of density and thickness of the unknown materials.

To more fully understand the theoretical considerations involved in this invention, the following analysis is offered. For a monoenergetic beam of gamma photons the absorption equation may take the form:

(1) $$N = N_o e^{-UDX}$$

where N represents the number of emerging photons, $N_o$ the number of incident photons, U the absorption coefficient for the particular material and photon energy, D the density of the test material and X the thickness of the test material.

In the event that the photon beam is attenuated by two different materials in proximity with one another and additionally in the event that the photon beam is comprised of two monoenergetic photon beams, (2) $$N' = N_o' e^{-(U_x' D_x X + U_y' D_y Y)}$$

(3) $$N'' = N_o'' e^{-(U_x'' D_x X + U_y'' D_y Y)}$$

N' and N'' represent the number of emerging photons after attenuation in each monoenergetic level by both thicknesses of material, $N_o'$ and $N_o''$ represent the number of photons provided by each source, respectively, $U_x'$ and $U_x''$ are the absorption coefficients of the X material for the two monoenergetic photon beams, $U_y'$ and $U_y''$ for the absorption coefficients for material Y, X and Y are the thicknesses of the two materials and $D_x$ and $D_y$ are the densities of the materials. These equations may be solved for the thicknesses of the two different materials, the resulting equations taking the form:

(4) $$X = \frac{U_y' \ln \frac{N''}{N_o''} - U_y'' \ln \frac{N'}{N_o'}}{(U_x' U_y'' - U_x'' U_y') D_x}$$

(5) $$Y = \frac{U_x'' \ln \frac{N'}{N_o'} - U_x' \ln \frac{N''}{N_o''}}{(U_x' U_y'' - U_x'' U_y') D_y}$$

It will be noted that the preceding equations may have conveniently been solved for the densities of the various materials, or for the product of thickness and density.

Thus, if a gamma gauge is designed to utilize a gamma emitting isotope system with at least two energies and a detection system is provided to separate and present the gamma photons corresponding to these two energies, it will allow the determination of the individual thicknesses and/or densities of two different materials by gamma photon absorption. In using Equations 4 and 5 the absorption coefficients, densities and unattenuated counting rates can be predetermined before measurement of the test object is undertaken. This leaves only the requirement that for individual thickness measurements the gauge must present two numbers (N' and N'') each identified with a corresponding photon energy, permitting the solutions of Equations 4 and 5. An additional feature of this invention arises because of the use of gamma radiation which will penetrate high density materials whereas the sub-atomic particles could not accomplish the same result.

It is accordingly a first object of this invention to provide apparatus measuring simultaneously the thicknesses or densities or the product of two dissimilar materials in proximity with each other.

It is a further object of this invention to measure the thickness of a material which is clad with a second material.

Still another object of this invention is the provision of a radiation thickness gauge for measuring the thickness of high density material.

A further object is the provision of a gamma thickness gauge utilizing multiple radioactive sources for producing gamma radiation of different energy levels for the determination of the thicknesses of materials.

Other objects and advantages of this invention will hereinafter become obvious from the following description while making reference to the enclosed drawing in which there is shown a block diagram of a system constructed according to the principles of this invention.

Referring to the FIGURE, there is shown gamma gauge system 10 comprising a source of gamma radiation and a detector 14 for the radiation attenuated by material 16 located therebetween. Source 12 would contain two gamma sources as for example cesium 137 and cobalt 60, or a single source emitting at least two different gammas such as Ir 192. The source capsules may be arranged in cascade with the cesium 137 capsule nearer the test object 16. This allows the more penetrating cobalt 60 gammas to be less attenuated while passing through the cesium 137 capsule. The gamma radiation would be detected in detector 14 initially by a high efficiency gamma scintillation counter (not shown). A typical such counter uses a sodium iodide thallium activated crystal, and the latter would be mounted to a multiplier photo tube, as is understood in the art. In such a counter the gamma photons are detected and generally produce a spectra of visible light photons that are related to the incident gamma photon energy. The output of this counter after the visible photons have been converted to voltage pulses by the multiplier photo tube, as is understood in the art, appears in the form of a series of voltage pulses whose amplitudes are related to the energies of the gamma photons. The remaining portion of system 10 now to be described is used to separate these different amplitude pulses, integrate the corresponding rates, and finally to present these rates with a suitable readout component.

The output pulses from detector 14 are passed to a cathode follower circuit 18 which is used to present a low impedance output which is delivered to a high speed amplifier 22 to raise the amplitude of the voltage pulses so that they may be of sufficient magnitude to trigger the circuits which follow. The amplified pulses from amplifier 22 are received by a pair of channels beginning with pulse height analyzers 24 and 26, respectively. Pulse height analyzer 24 responds only to the characteristic amplitude of pulses corresponding to one of the two gamma photon energies delivered by source 12. Analyzer 26 responds to the other characteristic amplitude. Following pulse height analyzer 24 there is provided a high speed amplifier 28 to receive and raise the amplitude of the output pulses from analyzer 24 to trigger high speed rate meter 32 which follows. Rate meter 32 consists here of a multivibrator which delivers pulses of uniform amplitude and shape in response to the pulses of varying amplitude from amplifier 28 and an integrating circuit for delivering a D.C. signal representative of the recurrence rate or frequency of these pulses. Rate meters of this type are known in the art. Rate meter 32 is followed by its own D.C. coupled cathode follower 34 which is used to present the output in form useful for a digital voltmeter 36 and a null balance meter 38.

Pulse height analyzer 26 is followed in its channel in similar fashion by its high speed amplifier 42, a high speed rate meter 44 identical to rate meter 32 and cathode follower circuit 46 delivering its output to voltmeter 36 and null balance meter 38. Null balance meter 38 is a typical galvanometer uncalibrated but indicating the magnitudes of the pulse recurrence rates. Digital voltmeter 36 is a sufficiently precise device found on the market measuring the analog voltage and presenting this voltage in the form of numbers appearing on the panel.

In the operation of this apparatus, the coated material 16 is placed between source 12 and detector 14. The gamma beam passing through material 16 is attenuated thereby and is detected by the scintillation counter and the multiplier photo tube in detector 14. Voltage pulses from the latter are fed to the preamplifier consisting of cathode follower 18 the output of which is amplified by amplifier 22 so that the pulses delivered therefrom will have a large spread in amplitudes. Pulse height analyzers 24 and 26 separate the amplitude distributed pulses. Analyzer 24 passes only pulses from one gamma source and analyzer 26 will pass only pulses from the second gamma source. The action of high speed amplifiers 28 and 42 and high speed rate meters 32 and 44 produce D.C. levels respectively which are a function of the respective recurrence rates of the pulses. Thus the D.C. level produced by rate meter 32 is a function of N′ given in Equations 4 and 5 while the D.C. level produced by rate meter 44 is a function of N″ given in Equations 4 and 5. Cathode followers 34 and 46 receive the D.C. signals and provide proper sources for the digital voltmeter 36 and/or null balance meter 38. The latter instruments readout the values of the analog D.C. voltages. The values may be substituted in Equations 4 and 5 and the thicknesses X and Y computed accordingly. The remaining parameters in these equations are known or can be determined before measurement of the test object 16 is begun. Or, if desired, the product of thickness and density, or density alone, may be computed in the manner previously set forth. It should also be noted that material 16 may be in continuous movement provided electronic system response relative to the speed of the test object 16 is rapid enough. The sodium iodide phosphor, for example, decays in about 0.25 microsecond and, therefore, all light pulses that occur with a time difference greater than 0.25 microsecond are resolved so that the resolving time of the system is dependent more upon the electronics than the crystal.

An arrangement made according to the principles of this invention was constructed and operated successfully. The two monoenergetic gamma photon beams were obtained by using the radio isotopes cesium 137 and cobalt 60. Detector 14 includes a scintillation counter composed of a Harshaw crystal (2″ diameter x 2″ thick) consisting of sodium iodide thallium activated crystal and an RCA multiplier photo tube (6342A). A slightly modified Picker channel analyzer #2970 was used for each of pulse height analyzers 24 and 26. The rate meters 32 and 44 consisted of multivibrator circuits accepting negative going pulses feeding output pulses of uniform amplitude to an RC integrating network for producing the analog D.C. output signal.

Because the pulses produced are randomly spaced, account should be taken of coincidence losses as expressed in the voltage readout. The correction coincidence formula used in this case would be:

$$(6) \qquad Ec = \frac{E}{1 - KE}$$

Where $Ec$ is the correct voltage corresponding to the counting rate fed into gauge 10 and $E$ represents the readout numbers while $K$ is a constant which depends on frequency calibration of the gauge and gauge resolving time. $K$ is obtained experimentally using known thicknesses of material.

It is thus seen that there has been provided a gamma gauge system for determining the thicknesses, the product of thickness and density, or density, of two dissimilar metals in proximity with one another. As example of where this apparatus would be particularly applicable for the measurement of density or the product of thickness and density is in the chemical processing industry where it is frequently desired to maintain the mixture of two organic liquids, for example, in a specified ratio. By the use of this apparatus applied to such a mixture while flowing the overall density or product of thickness and density measurements would be an accurate indication of this ratio and the process could be modified accordingly. The apparatus herein disclosed is capable of great accuracy merely by increasing the count rates of the various circuits involved.

Of course, many changes in this invention may be made without departing from the spirit and the scope thereof. Thus it is intended that all matter contained in the above description shall be interpreted as illustrative and not in the limiting sense.

I claim:

1. A thickness times density gauge comprising a source of gamma radiation at two monoenergetic levels, a detector spaced from said source to permit the insertion therebetween of a sample to attenuate said radiation, said sample consisting of at least two dissimiliar materials in close proximity with each other, said detector including means in response to the incidence of said attenuated radiation to produce a series of voltage pulses whose amplitudes are functions of the gamma photon energy incident on said detector, and means for receiving said pulses and separating the latter into groups of pulses having preselected ranges of amplitudes corresponding with the attenuated radiation from each of said levels, and means for measuring and reading out the recurrence rates of said groups of pulses as a measure of the effect in terms of thickness times density of each of said material attenuating each of said radiation levels.

2. The gauge of claim 1 in which one of said materials is a coating on the other of said materials.

3. The gauge of claim 2 in which the thicknesses of said materials are known and the recurrence rates of said groups of pulses thereby indicate the densities of said materials.

4. The gauge of claim 2 in which the densities of said materials are known and the recurrence rates of said groups of pulses thereby indicate the thicknesses of said materials.

5. The gauge of claim 1 in which the thickness of said sample is known and the recurrence rates of said groups of pulses thereby indicate the relative amounts of said materials making up said sample.

6. The gauge of claim 1 in which the sample is made up of high density materials.

References Cited in the file of this patent
UNITED STATES PATENTS

| | | |
|---|---|---|
| 2,884,535 | Swift | Apr. 28, 1959 |
| 2,897,371 | Hasler | July 28, 1959 |
| 2,922,886 | Putman | Jan. 26, 1960 |
| 3,004,163 | Edholm | Oct. 10, 1961 |